US008868100B1

(12) United States Patent
Price (10) Patent No.: US 8,868,100 B1
(45) Date of Patent: Oct. 21, 2014

(54) SYSTEMS AND METHODS FOR PREVENTING NOISE TRANSMISSION AT END OF TELEPHONE CALLS

(75) Inventor: Patrick Andrew Price, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 13/531,215

(22) Filed: Jun. 22, 2012

(51) Int. Cl.
*H04W 24/00* (2009.01)

(52) U.S. Cl.
USPC ..... 455/456.1; 455/566; 455/567; 455/550.1; 455/562; 455/413; 379/88.12; 379/88.18; 379/71; 379/79; 379/388.02

(58) Field of Classification Search
USPC ............ 455/456.1, 412–413, 462, 550.1, 455/566–567, 569.1; 379/88.12, 88.18, 71, 379/79
See application file for complete search history.

(56) References Cited

U.S. PATENT DOCUMENTS

| 5,224,151 | A | 6/1993 | Bowen et al. |
| 5,712,911 | A | 1/1998 | Her |
| 6,611,681 | B2* | 8/2003 | Henderson ............ 455/413 |
| 2004/0056651 | A1* | 3/2004 | Marietta Bersana ....... 324/207.2 |
| 2011/0319128 | A1* | 12/2011 | Miwa ............ 455/550.1 |

\* cited by examiner

*Primary Examiner* — Michael T Vu
(74) *Attorney, Agent, or Firm* — Maynard Cooper & Gale, P.C.; Jon E. Holland (57) ABSTRACT

A system for preventing noise transmission at the end of a telephone call includes a telephone having a handset and a base unit. The telephone has a proximity sensor configured to detect when the handset is in close proximity to the base unit prior to the handset contacting the base unit. A control element communicates with the proximity sensor and prevents transmission of sound received from the handset when the proximity sensor indicates that the handset is in close proximity to the base unit thereby preventing transmission of noise caused by the handset contacting the base unit.

10 Claims, 6 Drawing Sheets

SYSTEMS AND METHODS FOR PREVENTING NOISE TRANSMISSION AT END OF TELEPHONE CALLS

RELATED ART

Conventional telephones typically have a handset and a base unit. To use such a telephone, a user typically removes the handset from the base unit, indicating an off-hook condition, and speaks into a microphone located on the handset. At the conclusion of the call, the user places the handset on the base unit, indicating an on-hook condition to which the telephone is responsive for terminating the call.

The telephone call may be to a single user or to multiple users (e.g., a conference call). Also, the call may be to a public address (PA) system where the sounds detected by the microphone are emitted by at least one speaker of the PA system, typically throughout a building or other facility.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for preventing noise transmission at the end of a telephone call. An exemplary system comprises a telephone having a handset and a base unit. The telephone has a proximity sensor configured to detect when the handset is in close proximity to the base unit prior to the handset contacting the base unit. A control element communicates with the proximity sensor and prevents transmission of sound received from the handset when the proximity sensor indicates that the handset is in close proximity to the base unit thereby preventing transmission of noise caused by the handset contacting the base unit.

Figure 1:
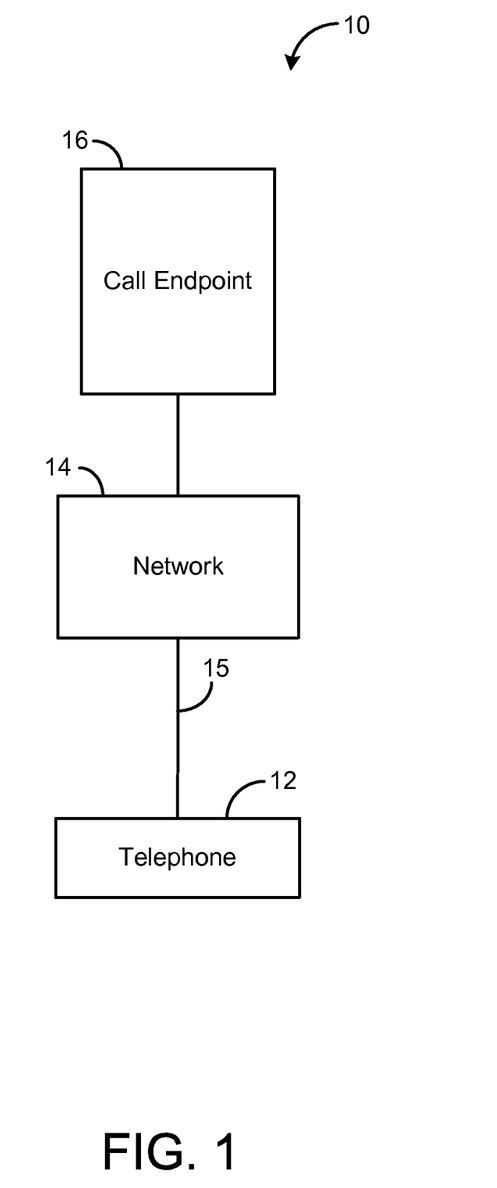
FIG. 1 is a block diagram illustrating an exemplary communication system in accordance with the present disclosure.

FIG. 1 depicts an exemplary communication system 10. The communication system 10 comprises a telephone ("phone") 12 coupled to a network 14 via a communication line 15. In one embodiment, the phone 12 comprises an internet protocol (IP) phone that is configured to communicate with the network 14, such as a local area network (LAN) or wide area network (WAN), e.g., the Internet, and the phone 12 is configured to transmit and receive one or more data packets through the network 14 via the communication line 15, which comprises at least one twisted-wire pair, optical fiber, or some other communication media. However, different types of phones 12 and networks 14 are possible in other embodiments. For example, in one alternative embodiment, the phone 12 comprises an analog phone and the network 14 comprises the public switched telephone network (PSTN).

The communication system 10 further comprises at least one call endpoint 16 coupled to the network 14. The call endpoint 16 is configured to receive telephone signals (e.g., analog voice signals or voice-over-IP (VoIP) packets) from the phone 12 via the network 14 and to convert the signals into sound for at least one user. In one embodiment, the call endpoint 16 comprises at least one telephone coupled to the network 14, and the call endpoint 16 communicates signals to and from the phone 12 via the network 14. FIG. 1 depicts only one call endpoint 16, but the call may have multiple call endpoints 16 (e.g., a conference call) in other embodiments. However, in one alternative embodiment, the call endpoint 16 comprises at least one PA system speaker configured to transmit the emit sound based on signals received from the phone 12 via the network 14. In such embodiment, the call endpoint 16 allows the user of the phone 12 to broadcast an audio message to one or more users in an environment, such as, for example, an office building.

The phone 12 comprises a handset (not shown in FIG. 1) and a base unit (not shown in FIG. 1), and the phone 12 is configured to detect when the handset is in close proximity to the base unit. The phone 12 is further configured to disable communication from the handset to the network 14 when the handset is in close proximity to the base unit such that the handset does not transmit signals to the call endpoint 16, as will be discussed in more detail hereafter. Accordingly, noise created when the handset collides with the base unit is not transmitted to the call endpoint 16.

Figure 2:
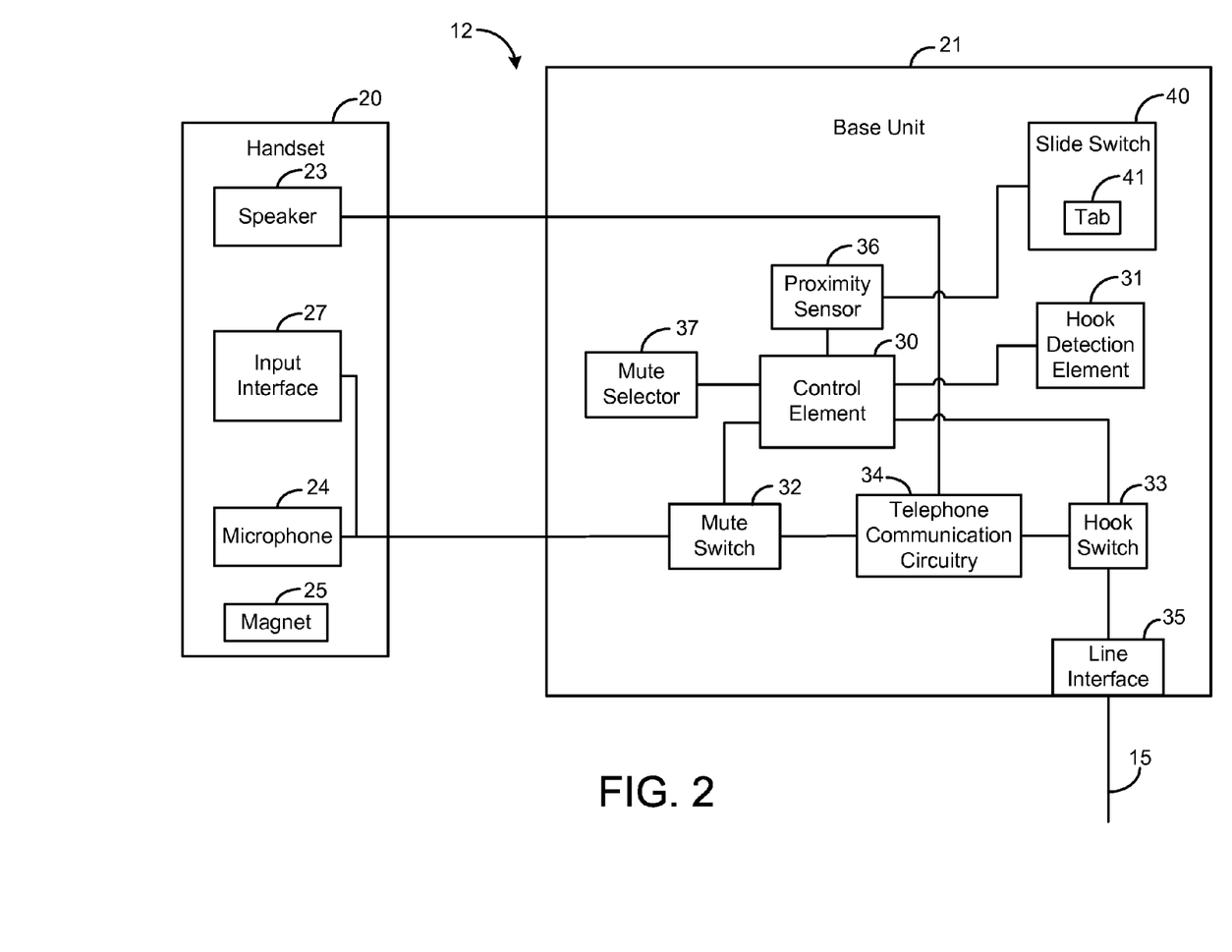
FIG. 2 depicts an exemplary embodiment of a telephone, such as is depicted by FIG. 1.

FIG. 2 depicts an exemplary embodiment of a phone 12, such as is depicted by FIG. 1. The phone 12 comprises a handset 20 and a base unit 21. The handset 20 may be removed from the base unit 21 and held close to a user's head in order to allow the user to make a telephone call. In one embodiment, depicted by FIG. 2, the phone 12 is implemented as an analog telephone. In such embodiment, the communication line 15 extending to the network 14 comprises a twisted-wire pair, and the phone 12 is configured to transmit and receive analog signals via the communication line 15. In one embodiment, the handset 20 comprises a speaker 23, a microphone 24, and a magnet 25. The speaker 23 receives signals from the communication line 15 and converts such signals to sound. Further, the microphone 24 detects sound (e.g., a user's speech) and converts such sound to electrical signals for transmission through the network 14. During a call, the signals received from the microphone 24 are transmitted to the call endpoint 16 (FIG. 1) via the network 14. In one embodiment, the handset 20 further comprises an input interface 27, such as, for example, a keypad, that allows the user to input data in order to manipulate the phone's operation. As an example, to initiate a call, the user may enter a telephone number for a telephone call via the input interface 22. However, the input interface 27 may be located on the base unit 21 in other embodiments.

In one embodiment, the base unit 21 comprises a control element 30, a hook detection element 31, a mute switch 32, a hook switch 33, telephone communication circuitry 34, a line interface 35, a proximity sensor 36, and a mute selector 37. The control element 30 is configured to control the operation of the phone 12 and manage the other components of the handset 20 and the base unit 21. In this regard, upon receiving a status signal from a component of the phone 12, as will be described in more detail hereafter, the control element 30 controls other components of the phone 12 in order to properly manage the telephone call, as will be discussed in more detail hereafter.

The hook detection element 31 is configured to detect an on-hook condition of the handset 20 and to transmit such detection to the control element 30. Based upon such detection, the control element 30 transitions the hook switch 33 between an open and closed position. In this regard, when the handset 20 is in the on-hook position upon the base unit 21, the hook switch 33 is in an open position such that no electrical current passes through the hook switch 33. Thus, any preexisting telephone call is terminated such that the phone 12 is not communicating via the communication line 15. When the handset 20 is removed from the base unit 21, the hook detection element 31 detects an off-hook condition and informs the control element 30 of the off-hook condition. The control logic 30 then transitions the hook switch 33 to a closed position such that a call may be initiated. In this regard, when in the closed position, the hook switch 33 allows current to pass, and current flows from a power source in the network 14. The user may then utilize the input interface 27 to initiate a telephone call, and during the call, signals from the microphone 24 are transmitted across the line 15 to the network 14 and ultimately to the endpoint 16. When the telephone call is completed, the user places the handset 20 on the base unit 21 such that the handset 20 is again in the on-hook position. The hook detection element 31 detects the on-hook condition and notifies the control element 30 which then transitions the hook switch 33 to an open position. The open position of the hook switch 33 prevents current from flowing thereby terminating the telephone call and preventing further transmission of signals via the communication line 15. While FIG. 2 depicts the element 31 coupled to the hook switch 33 through the control element 30, the element 31 may be coupled directly to the hook switch 33 in other embodiments such that the element 31 controls the hook switch 33 directly.

The mute switch 32 is configured to selectively prevent transmission of signals from the handset 20 via the communication line 15 without terminating the telephone call. In this regard, in one embodiment, the phone 12 comprises a mute selector 37 that, when pressed, allows the user to temporarily prevent transmission from the microphone 24 to the communication line 15 during the telephone call. In this regard, the control element 30 detects when the mute selector 37 is pressed and opens the mute switch 32 thereby preventing signals from passing through the mute switch 32. The user may press the mute selector 37 again in order to close the mute switch 32 when the user wishes to allow transmissions from the microphone 24 across the line 15. The mute switch 32 may be opened and closed as many times as the user desires during the telephone call without terminating the telephone call. The mute selector 37 may be located on the base unit 21, as shown by FIG. 2, or on the handset 20 as part of the input interface 27.

The telephone communication circuitry 34 is configured to process the signals communicated by the phone 12. As an example, the circuitry 34 may split or filter signals such that the signals from the microphone 24 interfere less with the signals received by the speaker, and the circuitry 34 may perform echo suppression or other functions. The line interface 35, such as, for example, an RJ-45 connector, allows the phone 12 to interface with the communication line 15. Other types of line interfaces 35 are possible in other embodiments.

The proximity sensor 36 is configured to detect when the handset 20 is within a predefined proximity of the base unit 21 and to notify the control element 36 of such detection. In one embodiment, the proximity sensor 36 comprises a reed switch configured to open and close based on the strength of a magnetic field in which the reed switch is situated. In this regard, when the magnet 25 is in close proximity to the proximity sensor 36, the magnetic field from the magnet 25 causes the proximity sensor 36 to be in a closed position. When the control element 30 detects that the proximity sensor 36 is in a closed position, the control element 30 opens the mute switch 32 thereby blocking signals from the microphone 24 such that sounds detected by the microphone 24 are not transmitted from the phone 12. For illustrative purposes, the proximity sensors described herein will be assumed to comprise a reed switch that operates as just described. However, it should be emphasized that, in other embodiments, other types of sensors 36 for sensing the proximity of the handset relative to the base unit are possible.

As the handset 20 is removed from the base unit 21 and travels away from the base unit 21, the magnetic field sensed by the proximity sensor 36 is reduced. When a predetermined distance from the base unit 21 is reached, the proximity sensor 36 transitions to an open position, and the control element 30 closes the mute switch 32 such that signals may pass and, thus, be transmitted from the handset 20 to the call endpoint 16 via the network 14. In one embodiment, the proximity sensor 36 transitions between the opened and closed states when the handset is about half of an inch from the base unit, although other distances are possible in other embodiments. Thus, the proximity sensor 36 should be in the open position when the distance between the handset 20 and the base unit 21 is about 0.5 inches or greater.

In one alternative embodiment, the predetermined distance is user configurable such that the user may selectively adjust the predetermined distance as desired. In such embodiment, the user may increase or decrease the predetermined distance through a variety of means, such as, for example, a mechanical switch positioned on the handset 20 or the base unit 21. As an example, as shown by FIG. 2, a slide switch 40 having a slidable tab 41 may be coupled to and used to control the sensitivity of the proximity sensor 36 and, hence, the predetermined distance. In such an embodiment, a user may increase the sensitivity of the proximity sensor 36 and, therefore, the predetermined distance by sliding the tab 41 in one direction, and the user may decrease the sensitivity of the proximity sensor 36 and, therefore, the predetermined distance by sliding the tab 41 in the opposite direction. In another embodiment, the user may provide an input via the input interface 27 or otherwise for selecting the desired sensitivity of the proximity sensor 36, and the control element 30 may be configured to control such sensitivity and, therefore, the predetermined distance based on the input. In yet another embodiment, the sensitivity of the proximity sensor 36 and, therefore, the predetermined distance may be provisioned by a user and established by the control element 30 based on such provisioning upon power up. Yet other techniques for configuring the predetermined distance are possible in other embodiments. In addition, the slide switch 40 may be included in any of the embodiments described herein, though it is only shown in the embodiment of FIG. 2 for brevity purposes.

When the telephone call is completed and the handset 20 is being returned to the base unit 21 for termination of the call, the proximity sensor 36 detects when the magnet 25 comes within the predetermined distance and transitions back to a closed position. The control element 30 detects the closed position of the sensor 36 and opens the mute switch 32 prior to the handset 20 striking the base unit 21 such that no signals are transmitted from the handset 20 to the call endpoint 16. Shortly thereafter, in response to detection of the on-hook condition by the hook detection element 31 after the handset 20 contacts the base unit 21, the call is terminated. Accordingly, muting the telephone call prior to contact between the handset 20 and the base unit 21 prevents undesirable noise transmission to the call endpoint 16 at the end of the telephone call.

Figure 3:
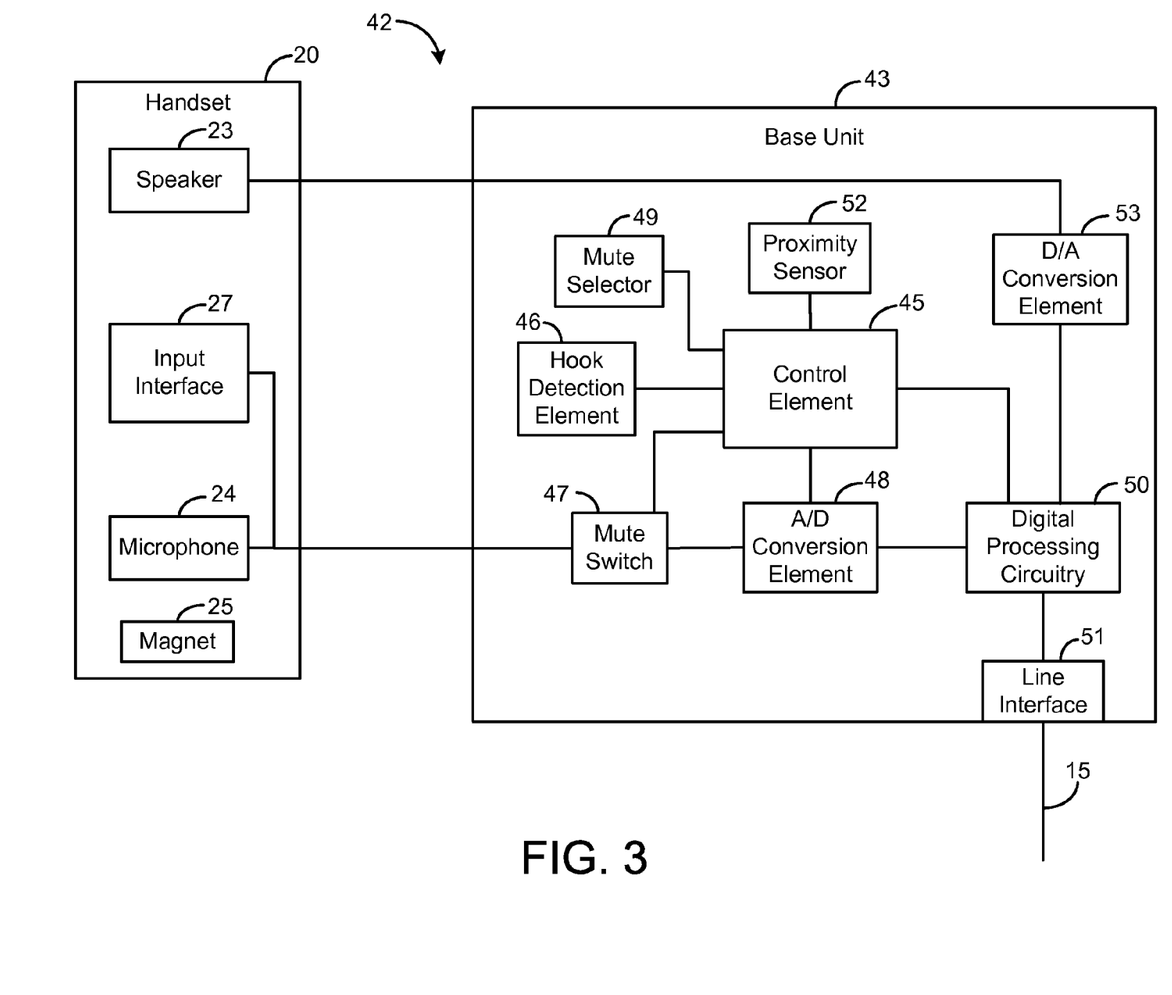
FIG. 3 depicts another exemplary embodiment of a telephone, such as is depicted by FIG. 1.

FIG. 3 depicts another exemplary embodiment of a phone 42. The phone 42 comprises a handset 20 configured identically to the handset of FIG. 2, and the phone further comprises a base unit 43. In one embodiment, the phone 42 is implemented as an internet protocol (IP) phone and the network 14 (FIG. 1) comprises an IP network, but different types of phones 42 and networks 14 are possible in other embodiments. The base unit 43 comprises a control element 45, a hook detection element 46, a mute switch 47, an A/D conversion element 48, a mute selector 49, digital processing circuitry 50, a line interface 51, a proximity sensor 52, and a D/A conversion element 53. The control element 45 is configured to control and manage the other components of the phone 42. The hook detection element 46 is configured identically to the hook detection element 31 (FIG. 2), and the element 46 is configured to detect an on-hook and off-hook condition of the handset 20 in order to initiate and terminate telephone calls, as set forth above. However, the hook detection element 46 is coupled to the control element 45 and informs the control element 45 of the on-hook or off-hook condition in order to allow the control element 45 to initiate or terminate calls appropriately. In other embodiments, however, the element 46 may be coupled to a hook switch (not shown) in order to initiate and terminate calls. The mute switch 47 is configured identically to the mute switch 32 (FIG. 2), and the mute switch 47 is configured to prevent transmission of signals to the call endpoint 16 (FIG. 1) when the switch 47 is in an open position. As set forth above, the mute switch 47 may be manually controlled by the user via the mute selector 49, and the mute switch 47 may be transitioned between the open and closed positions during a telephone call as many times as a user desires without terminating the call.

The A/D conversion element 48 is configured to receive an analog signal from the microphone 24 and to convert the analog signal into digital data. The D/A conversion element 53 is configured to receive a digital data from the digital processing circuitry 50 and to convert the digital data into an analog signal for transmission to the user via the speaker 23. The digital processing circuitry 50 is configured to receive and deencapsulate packets from the network 14 in order to provide the digital received by the D/A conversion element 53. Further, the circuitry 50 comprises a packetizer that is configured to receive digital data from the A/D conversion element 48 and to packetize the data into one or more data packets for transmission to the network 14.

The line interface 51, such as, for example, an RJ-45 connector, electrically interfaces the base unit 43 with the communication line 15 such that packets can be transmitted and received via the communication line 15. Other types of line interfaces 51 are possible in other embodiments.

The proximity sensor 52 is configured to detect whether the handset 20 is within a predefined proximity of the base unit 43, as described above for the embodiment depicted by FIG. 2. Thus, when the distance between the handset 20 and the base unit 43 exceeds a predetermined distance, the proximity sensor 52 no longer detects the presence of the magnet 25, and the sensor 52 transitions to an open position. The control element 45 then automatically closes the mute switch 47 such that signals from the microphone 24 during a telephone call pass and are, therefore, transmitted to the call endpoint 16. When the user is in the process of returning the handset 20 to the base unit 43 and the distance between the handset 20 and the base unit 43 becomes less than the predetermined distance prior to the handset 20 striking the base unit 43, the proximity sensor 52 is transitioned to a closed position due to the presence of the magnetic field of the magnet 25, and the control element 45 opens the mute switch 47. Accordingly, noise later created by the collision between the handset 20 and the base unit 43 is not transmitted to the call endpoint 16.

Figure 4:
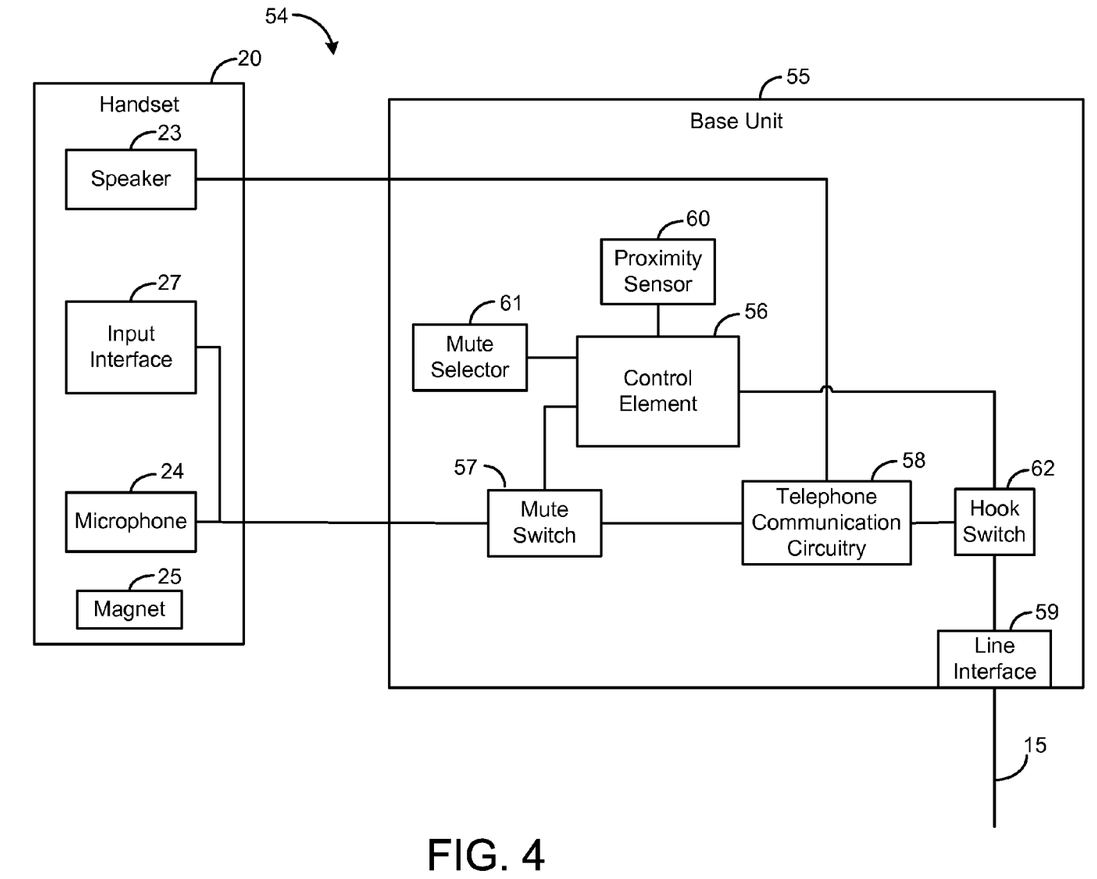
FIG. 4 depicts another exemplary embodiment of a telephone, such as is depicted by FIG. 1.

FIG. 4 depicts another exemplary embodiment of a phone 54. The phone 54 depicted by FIG. 4 is implemented as an analog phone, but other types of phones 54 are possible in other embodiments. The phone 54 comprises a handset 20 and a base unit 55. Note that the handset 20 is configured identically to the handsets 20 set forth in FIGS. 2 and 3. The base unit 55 is configured similarly to the base unit 21 set forth in FIG. 2. The base unit 55 comprises a control element 56, a mute switch 57, telephone communication circuitry 58, a line interface 59, a proximity sensor 60, a mute selector 61 and a hook switch 62. The mute switch 57, the communication circuitry 58, the line interface 59, and the mute selector 61 are configured identically to the mute switch 32 (FIG. 2), the communication circuitry 34 (FIG. 2), the line interface 35 (FIG. 2), and the mute selector 37 (FIG. 2), respectively, and operate as set forth above with respect to FIG. 2.

However, unlike the base unit 21 depicted in FIG. 2 and discussed herein above, the base unit 55 of FIG. 4 does not have the hook detection element 31 (FIG. 2). Instead of using the hook detection element, the base unit 55 uses the proximity sensor 60 to detect on-hook and off-hook conditions. In this regard, when the handset 20 is in an on-hook position, the magnet 25 is in close proximity to the proximity sensor 60. In one embodiment, the proximity sensor 60 comprises a reed switch, but different types of sensors 60 are possible in other embodiments. When the proximity sensor 60 is a predetermined distance from the magnet 25 such that the sensor 60 is within range of the magnet's magnetic field, the proximity sensor 60 is in a closed position, as described above for the embodiments depicted by FIGS. 2 and 3. When the user wishes to initiate a telephone call, the user removes the handset 20 from the base unit 55. Because the base unit 55 has no separate hook detection element, an off-hook condition is not detected until the handset 20 meets or exceeds a predetermined distance from the base unit 55 such that the proximity sensor 60 is no longer in range of the magnetic field of the magnet 25. In one embodiment, the predetermined distance is approximately 0.5 inches, although other distances are possible in other embodiments. As set forth above, in one alternative embodiment, the predetermined distance may be user configurable such that the user may selectively adjust the predetermined distance. Once the distance between the handset 20 and the base unit 55 exceeds the predetermined distance, the proximity sensor 60 transitions to an open position indicating that the magnetic field of the magnet 25 is not detected. Based on such indication from the proximity sensor 60, the control element 56 detects an off-hook condition and, in response, initiates the phone call by transitioning the hook switch 62 to a closed position such that signals may be transmitted via the communication line 15.

When the user desires to terminate the phone call, the user begins to place the handset 20 upon the base unit 55. As the handset 20 approaches the base unit 55, the distance between the handset 20 and the base unit becomes less than the predetermined distance such that the proximity sensor 60 detects the presence of the magnet's magnetic field, as described above for the embodiment depicted by FIGS. 2 and 3. The proximity sensor 60 transitions to a closed position, and the control element 56 immediately detects an on-hook condition and, in response, terminates the call by opening the hook switch 62 before the handset 20 contacts the base unit 55. Accordingly, any noise produced by the collision between the handset 20 and the base unit 55 is not transmitted to the call endpoint 16 (FIG. 1). Note that the mute switch 57 is not necessarily utilized for muting the call upon detection of the magnet 25 by the proximity sensor 60 in this embodiment because the call is terminated upon such detection. However, if desired, the mute switch 57 may be controlled as described above for the embodiments depicted by FIGS. 2 and 3 to help ensure that noise from the collision of the handset 20 and the base unit 55 is not transmitted from the phone 54.

Figure 5:
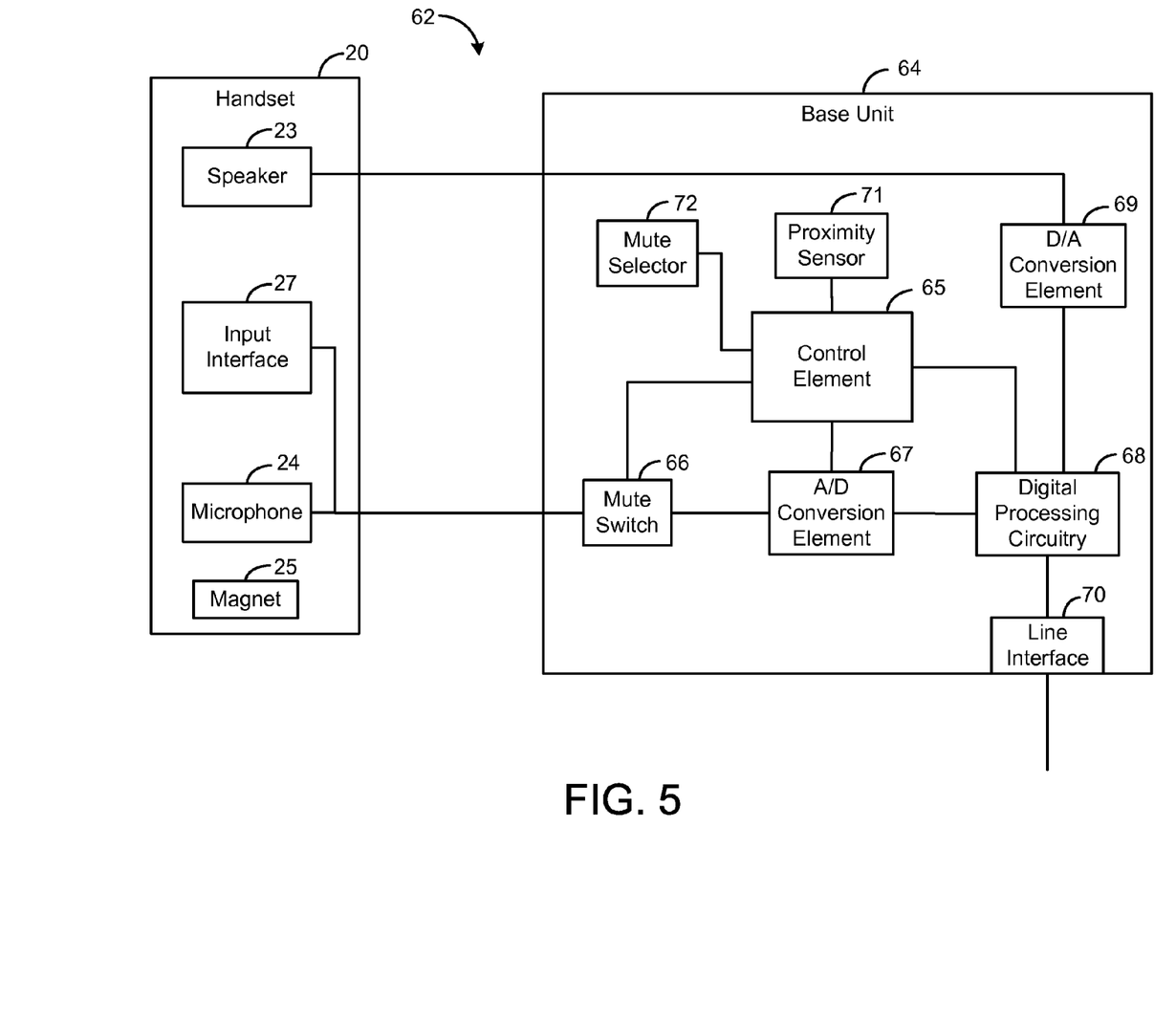
FIG. 5 depicts another exemplary embodiment of a telephone, such as is depicted by FIG. 1.

FIG. 5 depicts another exemplary embodiment of a phone 62. The phone 62 comprises a handset 20, as set forth above, and a base unit 64. In the embodiment depicted by FIG. 5, the phone 62 is implemented as an IP phone. Note that the handset 20 is identical to the handsets 20 set forth above with respects to FIGS. 2-4, and the handset 20 comprises a magnet 25. The base unit 64 comprises a control element 65, a mute switch 66, an A/D conversion element 67, digital processing circuitry 68, a D/A conversion element 69, a line interface 70, a proximity sensor 71, and a mute selector 72. Note that the components of the base unit 64 of FIG. 5 are configured similarly to the components of the base unit 43 of FIG. 3, but the base unit 64 does not have a separate hook detection element 46 (FIG. 3). Instead of using the hook detection element, the phone 62 uses the proximity sensor 71 and the magnet 25 to detect on-hook and off-hook conditions.

The proximity sensor 71 and the magnet 25 of FIG. 5 operate in an identical manner to the proximity sensor 60 and the magnet 25 of FIG. 4 such that a telephone call is not initiated until the distance between the handset 20 and the base unit 64 meets or exceeds a predetermined distance, and the call is terminated when the distance between the handset 20 and the base unit 64 is less than the predetermined distance. Thus, when a user wishes to terminate a call and place the handset 20 back onto the base unit 64, the proximity sensor 71 detects the magnetic field of the magnet 25 when the distance between the handset 20 and the base unit 64 is less than the predetermined distance. As set forth above, in one embodiment, the predetermined distance is approximately 0.5 inches, although other distances are possible. In one alternative embodiment, the predetermined distance may be selectively adjusted by the user, as set forth above. The control element 65 receives the indication from the proximity sensor 71 that the magnetic field is detected. In response, the control element 65 immediately detects an on-hook condition and terminates the call before the handset 20 collides with the base unit 64. In this regard, the control element 65 controls the digital processing circuitry 68 such that signals from the microphone 24 are no longer packetized for transmission to the network 14. That is, the signals from the microphone 24 are effectively blocked by the digital processing circuitry 68. The control element 65 also causes the circuitry 68 to transmit one or more control packets for signaling call termination to the network 14, as is typically done by conventional IP phones to terminate calls.

Accordingly, sound created by the handset 20 contacting the base unit 64 at the end of the call is not transmitted through the network 14 (FIG. 1) to the call endpoint 16 (FIG. 1). For example, when the call endpoint 16 comprises a PA system speaker (not shown) and the user utilizes the handset 20 to make a PA system page, the undesirable noise created by the handset 20 colliding with the base unit 64 is not transmitted via the PA system because the call is terminated before the handset 20 contacts the base unit 64. Thereafter, unnecessary nuisance and distraction caused by the undesirable noise created during such collision is avoided.

In one exemplary embodiment, assume that the phone 12 has the hook detection element 31 for detecting off-hook and on-hook conditions, as shown by FIG. 2. Further assume that the call endpoint 16 comprises a PA system speaker. Also assume that the proximity sensor 36 comprises a reed switch. Furthermore, assume that the handset 20 is in an on-hook position upon the base unit 21 and that a user desires to make a PA announcement through the PA system using the phone 12.

To initiate such a PA announcement, the user lifts the handset 20 from the base unit 21 thereby causing an off-hook condition. In this regard, the hook detection element 31 detects an off-hook condition, as shown by block 100 of FIG. 6, by detecting removal of the handset from the base unit 21, and the hook detection element 31 reports the off-hook condition to the control element 30. In response, the control element 30 transitions the hook switch 33 to a closed position, thereby closing the circuit between the phone 12 and the network 14 such that the network 14 provides a dial tone that is emitted by the speaker 23. After the dial tone is established, the user dials a telephone number for routing the current call to the call endpoint 16 thereby establishing a call between the phone 12 and the call endpoint 16.

At some point in the call, depending on the configuration of the PA system, the user speaks a verbal message that is broadcast by the PA system. That is, the user's speech is detected by the microphone 24, transmitted from the phone 12 to the PA system, which emits the same verbal message from at least one speaker of the PA system. After speaking the verbal message, the user returns the handset 20 to the base unit 21 to terminate the call and, hence, the PA announcement. The hook detection element 31 detects the handset 20 contacting the base unit 21 to sense an on-hook condition. The hook detection element 31 reports the on-hook condition to the control element 30, which opens the hook switch 33 and terminates the call. However, as will be described in more detail hereafter, the control element 30 activates the mute switch 32 before the detection of the on-hook condition such that the call is muted just prior to the handset 20 contacting the base unit 21.

Figure 6:
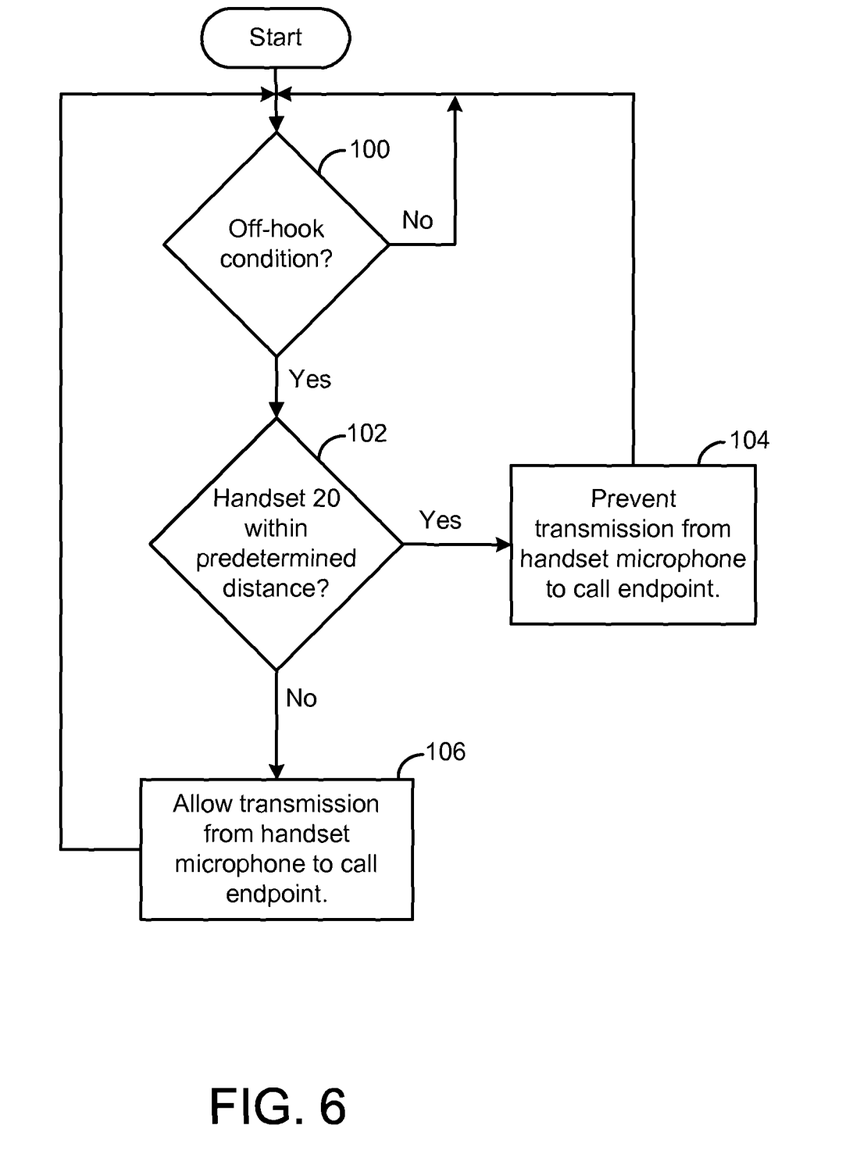
FIG. 6 is a flow chart illustrating an exemplary method for preventing noise transmission at the termination of a telephone call.

In this regard, once the off-hook condition has been detected in block 100, the control element 30 begins to monitor the proximity sensor 36 to determine when the handset has been moved to within a predetermined distance of the base unit 21, as shown by block 102 of FIG. 6. While the user is making the PA announcement, the handset 20 is likely positioned close the user's face and sufficiently far from the base unit 21 such that the handset 20 is further than the predetermined distance from the base unit 21. Thus, during the PA announcement, sounds (e.g., user's speech) detected by the microphone 24 are transmitted by the communication circuitry 34 through the network 14 to the call endpoint 16, as shown by block 106 of FIG. 6.

As the user is hanging-up the handset 20, the proximity sensor 36 detects a presence of the handset 20 within the predetermined distance before the handset 20 contacts the base unit 21. In this regard, once the handset 20 is moved to within the predetermined distance, the proximity sensor 36 senses the magnetic field emitted by the magnet 24 thereby indicating to the control element 30 that the handset 20 is within the predetermined distance. In response, the control element 30 prevents transmissions from the microphone 24, as shown by block 104 of FIG. 6, before the handset 20 contacts the base unit 21. In the instant example, the control element 30 activates the mute switch 32 thereby blocking electrical signals from the microphone 24 such that the sounds detected by the microphone 24 are not transmitted to the call endpoint 16. Thus, any sounds resulting from the handset 20 contacting the base unit 21 are not transmitted to the call endpoint 16 preventing such sounds from being emitted by the speakers of the PA system.

In the embodiments described above, a proximity sensor is described as residing at a base unit with a magnet residing at a handset. In other embodiments, such positioning may be reversed. That is, in any of the embodiments described herein, it is possible for a proximity sensor to reside at a handset and for a magnet to reside at a base unit. In such embodiments, the operation may be the same as that described herein when a proximity sensor is implemented at a base unit. Other changes and configurations would be apparent to a person of ordinary skill upon reading this disclosure.

Now, therefore, the following is claimed:

1. A telephone, comprising:
 a handset having a microphone;
 a base unit for receiving the handset;
 a proximity sensor configured to sense when a distance between the handset and the base unit is less than a predetermined distance without the handset contacting the base unit; and
 a control element configured to prevent transmission from the telephone of sound detected by the microphone based on the proximity sensor when the distance between the handset and the base unit is less than the predetermined distance,
 wherein the proximity sensor is configured to measure a magnetic field and to sense when the distance between the handset and the base unit is less than the predetermined distance based on the magnetic field.

2. The telephone of claim 1, further comprising a mute switch coupled to the microphone, wherein the control element is configured to activate the mute switch such that signals from the microphone are blocked by the mute switch when the distance between the handset and the base unit is less than the predetermined distance.

3. The telephone of claim 1, wherein the control element is configured to terminate the telephone call when the distance between the handset and the base unit is less than the predetermined distance.

4. The telephone of claim 1, further comprising a magnet positioned within the handset.

5. The telephone of claim 1, further comprising a magnet positioned within the base unit.

6. The telephoned of claim 1, further comprising a user interface for receiving an input for controlling the predetermined distance.

7. A telephone, comprising:
 a handset having a microphone; and
 a base unit for receiving the handset, the base unit having circuitry configured to establish a telephone call between the telephone and a call endpoint through a network, the circuitry configured to make a determination when the handset is moved to within a predetermined distance from the base unit during the telephone call before the handset contacts the base unit, the circuitry further configured to prevent, in response to the determination, the telephone from transmitting to the network sounds caused by the handset contacting the base unit,
 wherein the circuitry comprises a proximity sensor for detecting a magnetic field, and wherein the determination is based on the proximity sensor.

8. The telephone of claim 7, wherein the handset has a magnet for generating the magnetic field.

9. The telephone of claim 7, wherein the circuitry is configured to terminate the telephone call in response to the determination.

10. The telephone of claim 7, wherein the circuitry has a mute switch, and wherein the circuitry is configured to activate the mute switch in response to the determination.

* * * * *